Patented July 14, 1925.

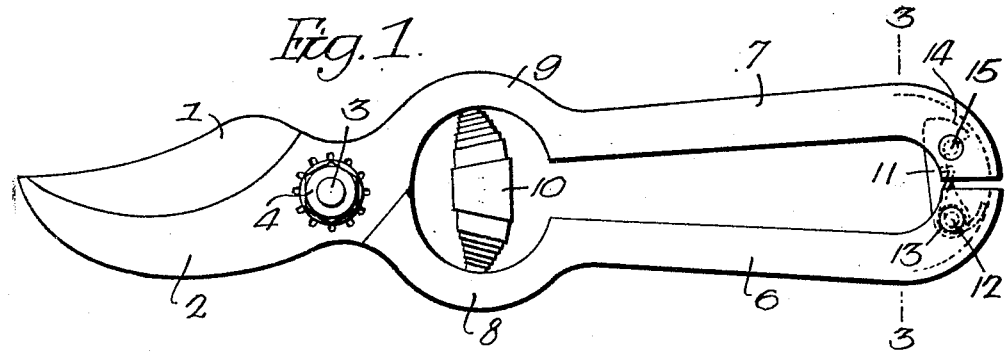
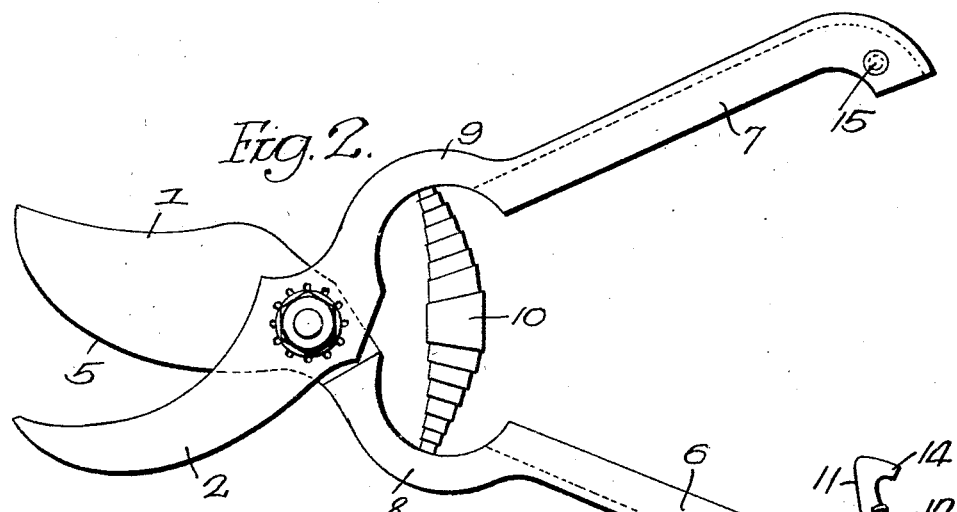
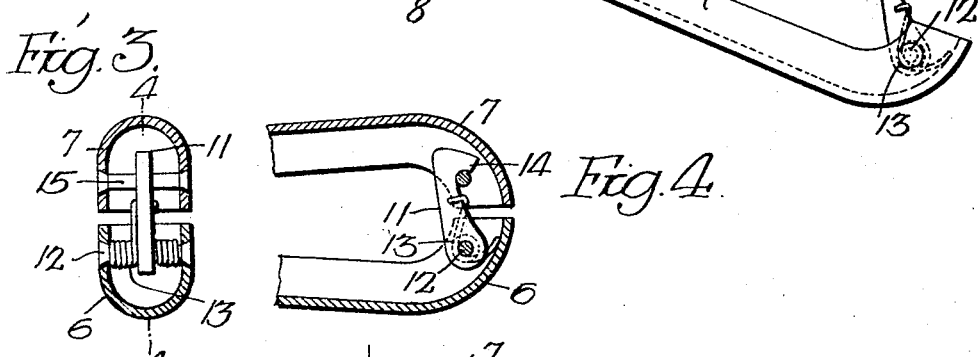
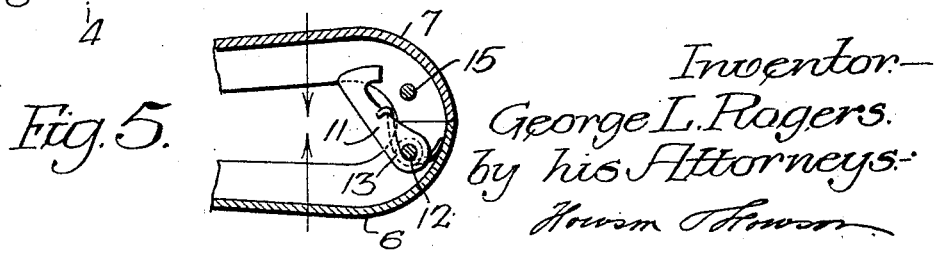

1,546,317

UNITED STATES PATENT OFFICE.

GEORGE L. ROGERS, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

PRUNING SHEARS.

Application filed December 4, 1923. Serial No. 678,448.

*To all whom it may concern:*

Be it known that I, GEORGE L. ROGERS, a citizen of the United States, residing in Philadelphia, Pennsylvania, have invented certain Improvements in Pruning Shears, of which the following is a specification.

One object of my invention is to make a pruning shears in which the blades and handles are made of forged steel, the handles being hollow.

Another object of the invention is to provide the shears with a concealed latch, which can be released when the handles of the shears are pressed together.

In the accompanying drawings:

Fig. 1 is a side view of my improved pruning shears closed and locked;

Fig. 2 is a side view illustrating the shears open;

Fig. 3 is a sectional view on the line 3—3, Fig. 1;

Fig. 4 is a sectional view on the line 4—4, Fig. 3, illustrating the latch closed; and Fig. 5 is a view, similar to Fig. 4, showing the two handles moved towards each other and the latch released.

Referring to the drawings, 1 and 2 are the blades of the shears, which are pivotally connected by a bolt 3 having a nut 4 by which the cutting edges of the blades can be adjustably held in contact to make a clean shear cut. The blade 1 has a sharp cutting edge 5 and the blade 2 has a blunt edge, curved as shown in the drawings. The two handles 6 and 7, of the blades 1 and 2, are made hollow, as shown in Fig. 3, and have solid curved sections 8 and 9, which are provided with pins for the reception of a spring 10 that separates the blades when released, as illustrated in Fig. 2.

The blades are made preferably of forged steel, but are light in weight and substantial.

In order to hold the shears closed when not in use, a latch 11 is provided. This latch is mounted on a pivot pin 12 within the handle 6. On the pivot pin is a coiled spring 13, one end of which engages the latch. The other end pressed against the inner wall of the handle. The spring 13 tends to force the latch into the open position, as shown in Figs. 2 and 5. The latch has an undercut head 14, which is arranged to engage a cross bar 15 within the handle 7. When the blades are closed, as in Figs. 1 and 4, the latch engages the cross bar 15 and holds the blades in the closed position.

In Figs. 1, 3 and 4, it will be noticed that the inturned ends of the handles are spaced apart, being held in this position by the spring 10. To release the blades, all that is necessary is to grasp the handles and apply pressure, as indicated by the arrows in Fig. 5, bringing the two handles in contact and moving the cross bar 15 towards the pivot 12, releasing the latch, which springs open, so that the shears can be manipulated.

When it is desired to close the shears, the handles are brought close together and the latch is pushed into engagement with the cross bar. When the handles are released, the spring 10 tends to push them apart. The latch is then in positive engagement with the pin, holding the blades, with the handles, slightly separated, as in Fig. 1.

It will be noticed that the latch is within the handles and, consequently, out of the way, also that the handle end of the shears is smooth and free of obstructions, and that the latch can be released by pressing upon the handles.

By this construction, all liability of pinching the fingers is avoided.

While the invention has been described as a pruning shears, it will be understood that it may be applied to any form of spring-actuated shears that are held in the closed position by a latch.

I claim:

The combination in pruning shears, of two blades; a pivot by which the blades are connected, each blade having a hollow handle with inturned ends; a spring tending to open the shears; a hooked latch; a pivot pin extending across the inturned end of the hollow portion of one handle and on which the latch is mounted; a spring on the pin engaging the latch; and a bar, extending across the inturned end of the hollow portion of the other handle, arranged to be engaged by the hook of the latch, the latch spring releasing the latch when the handles are forced towards each other.

GEORGE L. ROGERS.